3,071,510
PROTEIN-TAR ACID DERMATOLOGICAL
PREPARATION
Irving B. Wershaw, New York, and John E. Logun, Brooklyn, N.Y., assignors, by mesne assignments, to Dome Chemicals, Inc., Indianapolis, Ind., a corporation of Indiana
No Drawing. Filed June 5, 1958, Ser. No. 739,968
2 Claims. (Cl. 167—58)

This invention relates to a dermatological preparation for topical application to the skin. More particularly, this invention relates to a dermatological preparation which may be used as such (without added constituents) in baths and wet dressings and thus applied to the skin, or along with or as part of a cream or lotion.

It is among the objects of the present invention to provide a dermatological preparation which has the beneficial properties of both proteins and tars, particularly coal tars and wood tars and yet, unlike the proteins, as such, is chemically stable.

In accordance with the present invention, a defatted colloidal soy bean flour, hereinafter described, containing as its effective constituents a protein content of from 40% to 55% and a carbohydrate content of from 25% to 30%, is mixed with a tar extract containing the tar acids present in tar and tar distillates. An amphoteric reaction takes place between the proteins and the tar acids; also with the tar bases, if present. Proteins present in the defatted soy bean flour, such as glycinin, phaseolin and legumelin, react with the tar acids to produce phenolates, xylenates, cresolates, etc. Thus the tar acids serve to neutralize and reduce the basicity of the protein fraction. The latter has a pH of from 6 to 7. The mixture with the tar acids, on the other hand, has a pH of from 5 to 5.5, which, it will be noted, is close to the usual pH of the skin, generally about 4.5

The defatted soy bean flour employed in the present invention is made by dehulling soy beans, i.e. removing the outer skin of the beans, then extracting the dehulled soy beans with an organic fat solvent having a boiling point below 100° C. to remove from the beans drying oils and fats and thereafter milling or grinding the residue or marc to produce colloidal particles. One such defatted soy bean flour has a chemical composition approximately as follows:

| | Percent |
|---|---|
| Protein | 52.0 |
| Carbohydrate | 30.0 |
| Fat | 0.5 |
| Lecithin | Trace |
| Ash | 6.0 |
| Fiber | 3.0 |
| Moisture | 7.0 |

It is produced, for example, by dehulling soy beans, milling the dehulled soy beans to produce soy bean powder or flour and extracting the powder with a low boiling organic solvent such as ether, chloroform or petroleum benzene to remove fats. The amount of solvent used is not critical as long as it is sufficient to remove substantially completely the fats present. The fat extraction desirably is carried out at room temperature by mixing the soy bean powder with the solvent and then expressing the solvent containing the fats in solution. The solid residue, termed marc, is then milled or ground to colloidal fineness. This fraction, thus produced, is mixed with the tar fraction, hereinafter described, to produce the product of this invention.

The above chemical composition of the defatted soy bean flour, it will be understood, represents one chemical analysis of a specific fraction useful in making dermatological preparations embodying this invention. This invention, however, is not limited to the use of this particular fraction. The chemical analysis will, of course, differ somewhat, depending upon the source of the soy bean and the exact procedure followed in processing it. The present invention comprehends the use of defatted colloidal soy bean flour having a protein content of from 40% to 55%, and a carbohydrate content of from 24% to 30%. From 4% to 6% ash, from 2% to 3% fiber, from 7% to 8% moisture and small amounts of fat and lecithin constitute the remainder of the defatted soy bean flour.

The tar extract employed is made by extracting coal tar, wood tar, or tar distillates containing tar acids (sometimes also small amounts of tar bases) with a solvent which removes the tar acids, but does not dissolve any appreciable amount of the free carbon, other carbonaceous residue and higher boiling constituents such as naphthalenes, anthracenes, etc. Suitable solvents are alcohol (methanol or ethanol), acetone, benzene, chloroform, ether and carbon disulphide. The extraction of the tar or of the tar acid containing distillate, desirably is carried out at room temperature to produce a solution containing from 30% to 60% by weight of tar acids. Low temperature tars (having a distillation range of 450° C. to 700° C.) as well as high temperature tars (having a distillation range of 900° C. to 1200° C.) may be extracted to obtain tar acid containing solutions or extracts for use in making the dermatological preparations of this invention.

This tar acid solution is admixed with the above described defatted soy bean flour in relative amounts of from 1 to 2 parts of the soy bean flour for each part by weight of the tar extract. When the tar extract is relatively concentrated, say it contains about 50% to 60% of tar acids, it should be mixed with approximately 2 parts of soy bean flour per part of tar extract to obtain a mixture having the desired pH within the range of 5 to 5.5. On the other hand, each part of a dilute extract, containing say from 30% to 40% tar acids, should be mixed with approximately one part soy bean flour.

The tar acid extract contains an involved mixture of tar acids and, in some cases, small amounts of tar bases, such as pyridine, quinoline, isoquinoline, etc. The tar acids have the general formula $R(OH)_n$ in which R is a benzene radical or a naphthalene radical and $n$ is an integer, usually from 1 to 3. Examples of such tar acids are phenol, orthocresol, resorcinol and alpha-naphthol. The extract containing these compounds is acidic in character, has a pH of from 3 to 4 and varies within this range because of the variations in the composition of the tar subjected to extraction.

Surprisingly, the mixture of tar acids and defatted soy bean flour is stable, i.e. has little or no tendency to decompose. The defatted soy bean flour by itself tends to decompose and lose its amphoteric properties upon changes in atmospheric conditions. Usually it becomes basic due, it is believed, to the formation of amino compounds. When admixed with the tar extract as herein described, a reaction takes place between the hydroxyl groups of the tar acids and the amino groups, forming protein phenolates, cresolates, etc., which are comparatively stable.

The following examples are given for purposes of illustrating the invention. It will be understood the invention is not limited to these examples. The defatted colloidal soy bean flour employed in these examples had the following analysis:

|  | Percent |
|---|---|
| Protein | 52.5 |
| Carbohydrate | 30.1 |
| Fat | 0.6 |
| Lecithin | Trace |
| Ash | 6.0 |
| Fiber | 2.8 |
| Moisture | 8.0 |

*Example I*

The tar extract employed in this example is made by extracting a coal tar fraction, having a boiling range of 160° C. to 230° C. (middle oil) with methanol to produce a methanol solution containing approximately 40% of tar acids. 2 parts of this solution are mixed with 1 part of defatted soy bean flour. The resultant mixture is heated on a steam bath to drive off residual methanol. The dry product is milled. It has a pH of 5. It is useful in topical application to the skin by dusting on the skin, or along with water in a wet dressing. It keeps indefinitely without showing any signs of decomposition. It has all of the beneficial properties of both proteins and coal tar for the treatment of skin irritations and, unlike the proteins, is chemically stable.

*Example II*

In this example, 100 parts of coal tar (tar obtained from the high temperature distillation of coal, i.e. coke oven tar) are extracted with 200 parts of chloroform. The chloroform solution is filtered, removing insoluble material, and to the resulting extract containing about 50% by weight of tar acids, is added 100 parts of the defatted soy bean flour. The resultant mixture is warmed in a steam bath for about fifteen minutes while agitating to drive off the chloroform solvent. It is then powdered, producing a product having the valuable constituents of the tar acids and protein. It can be used as such, or incorporated in creams or lotion for topical application to the skin. It has the beneficial properties of both coal tar and proteins.

*Example III*

A heavy oil fraction derived from high temperature coal tar and boiling within the range of 230° C. and 270° C. is extracted with ether producing an ether solution of tar acids containing about 55% by weight of tar acids, chiefly cresols, naphthols and xylenols and small amounts of tar bases, chiefly quinolines and isoquinolines. This ether extract is mixed with an equal weight of the defatted soy bean flour and the resultant mixture warmed to drive off the ether. The dry material is powdered to produce the product of this invention suitable for topical application to the skin.

It will be noted the present invention provides a dermatological preparation which has the beneficial properties of both proteins and tars, and yet unlike the proteins, as such, is chemically stable.

It will be understood that this invention is not restricted to the present disclosure otherwise than as defined by the appended claims.

What is claimed is:

1. A dermatological preparation consisting essentially of the reaction product of a tar acid extract from a tar of the group consisting of coal tars and wood tars, the tar acid content of said extract consisting of a mixture of tar acids having the formula $R(OH)_n$ in which R is from the group consisting of benzene and naphthalene radicals and $n$ is an integer from 1 to 3, inclusive, the extract containing from 30% to 60% by weight of the tar acids and having a pH of from 3 to 4, said tar acids consisting mainly of cresols, naphthols and xylenols, and a defatted soy bean flour having a protein content of from 40% to 55% by weight, and a carbohydrate content of from 25% to 30% by weight, in the proportions of from 1 to 2 parts of said soy bean flour to 1 part tar extract.

2. A dermatological preparation as defined in claim 1, in which the defatted soy bean flour contains about 52% protein and about 30% carbohydrate.

References Cited in the file of this patent

UNITED STATES PATENTS

| 2,185,255 | Kroper | Jan. 2, 1940 |
| 2,876,164 | Wershaw | Mar. 3, 1959 |

OTHER REFERENCES

D & C, Drug and Cosmetic Industry, August 1944, page 220.

Spalton: Pharmaceutical Emulsions, Chemist and Druggist, London, pages 23–27.

Frazier: Formulary for External Therapy of the Skin, Chas. C. Thomas, Springfield, Ill. (1954) pages 89–91.

Remington: Practice of Pharmacy, Mack Publ. Co., Easton, Pa. (1956), page 166.

Dispensatory of the USA, 24th Ed., Lippincott Co., Philadelphia, 1947, pages 1186–6.

Butterworth: Archives of Dermatology and Syphilology, 61:4, April 1950, pages 678–679.